(12) United States Patent
Walker et al.

(10) Patent No.: US 6,459,363 B1
(45) Date of Patent: Oct. 1, 2002

(54) TWO WIRE COMMUNICATION SYSTEM

(75) Inventors: Kevin Walker, Bishop's Bridge (AU); Mike Ramplin, East Maitland (AU)

(73) Assignee: Ampcontrol Pty Ltd., Warners Bay (AU)

( * ) Notice: Subject to any disclaimer, the term of this patent is extended or adjusted under 35 U.S.C. 154(b) by 0 days.

(21) Appl. No.: 09/403,889

(22) PCT Filed: Mar. 11, 1999

(86) PCT No.: PCT/AU99/00151
§ 371 (c)(1),
(2), (4) Date: Jan. 25, 2000

(87) PCT Pub. No.: WO99/46868
PCT Pub. Date: Sep. 16, 1999

(30) Foreign Application Priority Data

Mar. 11, 1998 (AU) .............................................. PP2293

(51) Int. Cl.$^7$ ............................................. H04M 11/04
(52) U.S. Cl. ............................. 340/310.01; 340/310.06; 340/310.02
(58) Field of Search ....................... 340/310.01, 310.06, 340/310.07, 310.02, 933, 941, 310.03; 246/166.1, 167; 104/88.03

(56) References Cited

U.S. PATENT DOCUMENTS

| 5,920,253 A | * 7/1999 | Laine ....................... 340/310.1 |
| 5,986,539 A | * 11/1999 | Johansson ................ 340/310.1 |
| 6,005,475 A | * 12/1999 | Takasan .................. 340/310.01 |

FOREIGN PATENT DOCUMENTS

| EP | 206483 | 12/1986 |
| EP | 858174 | 8/1998 |
| GB | 2300849 | 11/1996 |

OTHER PUBLICATIONS

Derwent Abstract Accession No. 93–233862/29, class W02, SU 1748257 A1 (NOVOS Electrotech Inst) Jul. 15, 1992—abstract.

* cited by examiner

*Primary Examiner*—Anh V La
(74) *Attorney, Agent, or Firm*—Foley Hoag, LLP

(57) ABSTRACT

A two wire communication system capable of transmitting data and transferring power by the used of an electrical bi-polar waveform across a two wire conductor from a controller in communication with the two-wire conductor to at least one module in communication with the controller and capable of transmitting data from the module to the controller; and a remote electrical device in communication with the controller. Usable data may be continuously transmitted across the two wire conductor independent of and during power transmission between the controller and the at least one module without loss of data transmission time and without affecting the transfer of power to the at least one module. The data is transmitted across the two wire conductor to the modules by pulse duration signals at the same time power is transmitted to the modules. The system is capable of using up to 100% of transmission time to transmit data without affecting transfer of power to the at least one module.

27 Claims, 3 Drawing Sheets

TWO WIRE COMMUNICATION SYSTEM

BACKGROUND

Figure 1:
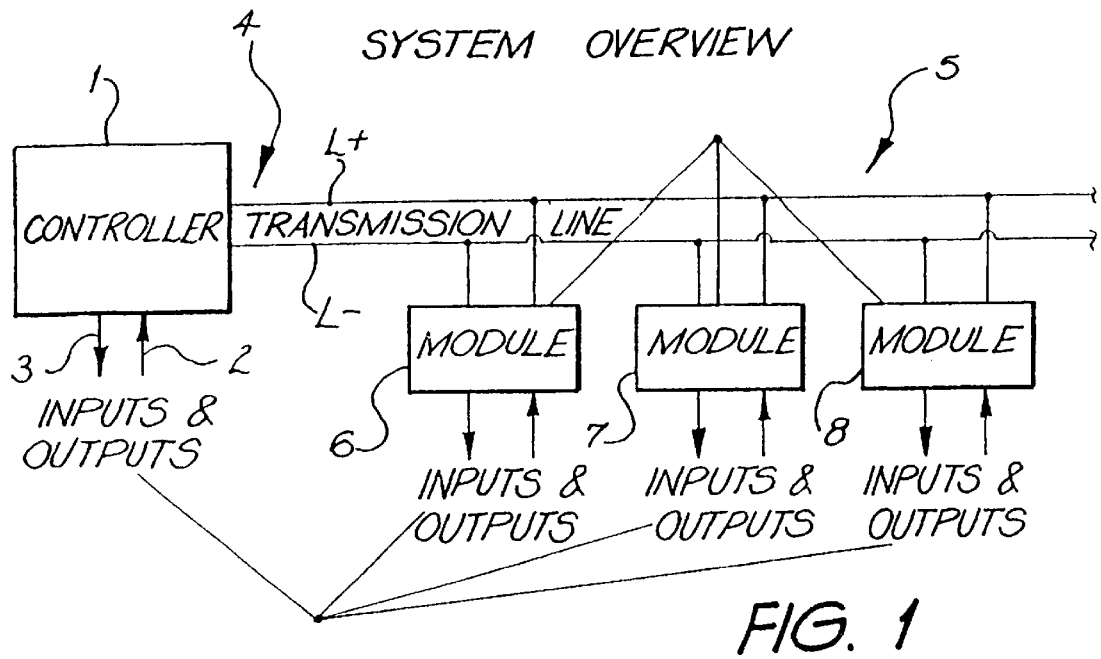

The present invention relates to the field of data communication systems and to distributed two wire communication systems. More particularly the invention relates to a two wire communication system utilising a communication protocol in which an electrical bi-polar waveform is used for data transmission and power transfer over a two wire conductor system. The protocol is a physical layer protocol which defines the electrical waveform applied to a two wire conductor system acting as the transmission means. The two wire conductor system is used to interconnect a Controller and at least one module but preferably a multiplicity of modules. Throughout the specification the term Controller will be used to describe a device which controls the two wire conductor and the term Module will be used to describe a device which connects to the two wire conductor. In operation the communication protocol allows data communication between the Controller and the Modules across the two wire conductor by a digital communication methodology which is provided by the bi-polar waveform structure as defined in the protocol. Power transfer via the two wire conductor from the controller to the modules is also achieved by the bi-polar waveform structure as defined by the protocol.

PRIOR ART

Two wire conductor systems are known in the electrical engineering and electronics fields as a means of data and power transmission. Systems of this type generally known as Down Line Powered two wire conductor communication system (DLPCS) typically employ a controller which drives power into the two wire conductor systems, controls the timing of data transfer and transmits and receives data.

They also employ modules which draw power from the two wire conductor and transmit and receive data DLPCS's can be classified into uni-polar DLPCS's and bi-polar DLPCS's. Most data and power transmission systems use different conductors for the transmission of data and the transmission of power. However, in low power applications where the length of the conductors between the Modules and the Controller is large, the transfer of power and data over the same two conductors can give large cost savings compared with multiple conductor systems. A unipolar DLPCS is a system where the Controller drives power down the two wire conductor using one voltage polarity. Data is transferred between the Controller and Modules by modulating the voltage (between voltages of the same polarity) and current (positive or negative). Power can be transferred from the Controller to the Modules while ever the line voltage are higher than the internal voltage of the Modules A telephone system is an example of a uni polar DLPCS wherein power is drawn continuously from the line by the telephone which transmitts the voice signal by modulating the telephone's impedance. The change of impedance modulates the voltage and current on the two wire communication line. Digital data transfer via the telephone DLPCS usually requires special modulation techniques using modems.

Another uni-polar DLPCS provides for a controller and multiple modules connected to a two-wire line and supports digital data only. The modules draw power whenever the voltage is high. Digital data is transmitted and received by the modules during periods when the voltage on the two -wire line is 'low'. The controller lengthens the 'low' voltage period if a low impedance is detected across the two wire line. Modules transmit data by modulating their impedance in the 'low' voltage periods. An advantage of this signaling technique is that all modules connected to the two wire line receive all data transmitted over the two wire line. Module to module communication is also possible. The 'low' voltage disables power transmission so the controller can easily detect the data signal. A disadvantage of this approach is that the 'low' voltage has a low noise margin (the amount of noise voltage that is needed to corrupt the data). Another disadvantage is that it is difficult to adjust the speed of operation to accommodate different operational environments.

Another two wire utility data communication system for communicating utility meter readings over two wires is disclosed in Australian patent application 64664/94. The specification teaches communication systems used to transmit consumption data from a meter such as an electric, gas or water meter to remote meter reading units. The system described is very similar to a well known field known as M-BUS and provides for a controller and multiple modules connected to a two-wire line. The invention described comprises a reader/programmer for communicating with a utility meter or the like over at least two-wire lines. The system described includes means for generating an interrogate signal, means for demodulating a data signal received from the utility meter over the two-wire lines wherein the data signal consists of a current in the two-wire lines which varies in accordance with data being transmitted from the utility meter when the reader/programmer is connected via two wire lines and means for demodulating the data signal received from the utility meter over the wire lines wherein the data signal has characteristics which vary in accordance with the data being transmitted from the utility meter.

Each meter includes an encoder which converts consumption information displayed by a mechanical or electronic register associated with the meter to a form which can be transmitted over wires or the like to a remotely located meter reading unit. The specification also teaches the use of three wire communications for the system. When operating in the two wire mode the reader/programmer and encoder are inductively coupled.

The encoder includes circuitry for varying an impedance in accordance with data representing the quantity being measured by the meter to cause the current flowing between the encoder and the remote reader/programmer to be modulated in accordance with the data.

The system is relatively complicated in the coding and decoding of the signals in comparison to pulse duration signals and furthermore it does not permit use of 100% of data transmission time when transmitting power due to the nature of the uni-polar signaling used to transmit both power and data. The modules draw power while ever the voltage is 'high'. The controller transmitts binary data to the modules by modulating the voltage between 'high' and zero voltage. The modules transmit data to the controller by modulating the line current on the two-wire line by varying the modules's impedance. This system works well when the module's data current is much larger than the power consumption current. It is therefore a disadvantage that power consumption is limited. Another disadvantage of this system is that modules can only receive data from the controller. Also the communication speed can be adjusted to meet unusual operating conditions but the speed is generally limited to fixed baud rates and it is difficult to change baud rates during operation.

Another known digital uni-polar DLPCS employs said two-wire protocol wherein the modules draw power when the voltage is high. In that system the controller transmits data to the modules by modulating the voltage between 'high' and zero voltage. The modules transmit data to the controller by modulating their impedance which modulates the line voltage and current. In this case all modules connected to the line can receive all data transmitted on the two-wire line as the modules modulate the voltage between 'high' and near zero voltage. The key disadvantage of this system is that very little power can be transmitted and communication speed has to be fixed.

Bi-polar DLPCS's are systems where the controller drives power down the two wire conductor using an alternating voltage polarity.

Data is transmitted between the controller and modules by modulating the voltage and /or current. The module's circuitry, which draws power from the line and enables data transfer by modulation of the voltage or the current, is more complex than the uni-polar interface circuitry of the DLPCS. Bi-polar systems have a number of advantages including the ability to detect a change of polarity more reliably and with less circuitry than a voltage level in the uni-polar systems. A further advantage is that the bi-polar system has twice the noise margin of a uni polar system for a given line voltage. Another advantage is that power transmission can occur during either polarity. The bi-polar signal supports binary communication, and low voltage periods, as in some uni polar systems, can be eliminated.

Australian patent 481585 (82170/75) discloses a signal transmission system for telemetering instruments and controllers in a process control system. It is an object of the invention described in that patent to provide a signal transmission system capable of transmitting data in terms of pulse duration together with power necessary to operate process instruments. The patent teaches that data transmission and power transmission are carried out alternately by changing the polarity of the line voltage. It is a further object of the invention disclosed in that patent to provide a signal transmission system capable of analogue-to-digital and digital-to-analogue conversion for signal transmission.

The system described is complex in that it employs diodes including a photocoupler which allow current to flow forward and which are capable of detecting the flow of current. As part of its operation, a signal start drives a converter so that process data is converted into a pulse width proportional to its analogue value. The patent teaches signal transmission and power transmission carried out alternately by changing the polarity of the loop current. Alternatively, the value of current, the polarity of voltage or the value of voltage may be changed to set up transmission systems for signal and power. Instead of proportional relationship between pulse width and analogue value, a logararithmic, exponential, square or like relationship may be used for the two signals. During data transmission, (lie controller modulates the data pulse duration in response to a change of impedance caused by the modules. This has the advantage that all modules can receive all data transmitted on the line.

The key disadvantage of this system is that no useful information is transmitted during the power period, wasting a significant percentage of the available transmission communication time. Furthermore, there is no means to enable the transmission of power during the data periods when the controller is the originator of the data. The system described is said to be readily compatible with digital systems as well as analogue systems.

The primary disadvantage of the system described in that patent is that during periods of power transmission no useful data transmission can occur.

Another known two wire system is described in Japanese publication No.5003457 but this arrangement also suffers from the disadvantage that data transmission time is compromised during power transmission. In fact a significant amount of time is devoted to power transmission which prevents data transmission during that period.

The prior art arrangements for transmitting data and power over the same two wires are disadvantaged by the fact that they devote a percentage of the total transmission time to the transfer of power during which phase no useful data is transmitted According to the prior art methodology, up to 50% of the available transmission time is used for transferring power to modules. Furthermore, all uni-polar prior art systems have much smaller noise margins and so are more susceptible to noise on long distance transmission.

Another prior art in digital bi-polar DLPCS involves power and data transmission by the controller to the modules at a 'high' bi-polar voltage and the modules respond using a low bi-polar voltage. In this system high communication speeds are possible. The 'low' voltage transmission in this case can be made robust in the presence of noise because the modules directly drive the line voltages. The disadvantage of this approach is that the modules use significant power whenever they transmit data and the length of time that can expire between power transmissions from the controller necessitates large energy storage devices in all modules. Up until the present, the art has not included a system which modulates the pulse duration of both polarities with data and allows power to be drawn from either polarity depending on the data being transmitted. It is now possible using this system to power and communicate with hundreds possibly thousands of modules on a low cost cable.

Whilst the industry has been well served by standard communication techniques where power and data are run in separate cables there has been a long felt want for a system which enables communication and power transmission over long distances say greater than 5 kilometers and particularly in environments where power voltage and current must be kept at low levels for safety reasons but without compromise to data transmission time. Such a system can be used to advantage in explosive mining environments where long distances require increased power transmission but regulation requires a power not to exceed a predetermined maximum and where data transmission is desirable 100% of the time.

THE INVENTION

The present invention seeks to overcome theaforesaid prior art disadvantages by providing a two wire communication system in which data and power are transferred over the same two wires using a bi-polar signal such that useful data can be transmitted independant of and during power transmission without loss of data transmission time.

According to the invention 100% of the transmission time is used in data transmission without affecting the transfer of power to the modules connected to the two wire conductor. According to the prior art in comparison. up to 50% of transmission time may be lost in transfering power to the modules.

The arrangement of the present invention utilises a bi-polar signal which has a very large noise margin. As each period is followed by a period of the opposite polarity and only one value (analogue or digital) is conveyed during each period, there is no fixed timing with respect to data. Also, the line speed can be increased or decreased at an arbitrary baud rate, because timing information for data sampling is passed with each transition of the polarity. Further, the arrangement of the invention can support full duplex protocols on a single two wire conductor system. The protocol supports two data channel for simultaneous independant data transmission in both directions.

It is one object of the invention to provide a two wire communication protocol for a communication system which is capable of transmitting data in terms of pulse duration together with power to at least one but preferably a multiplicity of modules connected to the two-wire conductor wherein useful data may be sent 100% of the time and allow the designer to specifiy the power duty cycle required for the application.

In one broad form the present invention comprises:

a two wire communication system capable of transmitting data and transferring power by means of an electrical bi-polar waveform across a two wire conductor from a controller in communication with said conductor to at least one module in communication with said controller and/or data from said at least one module to said controller; the system including a remote electrical device in communication with said controller;

wherein useable data may be continuously transmitted across said two wire conductor independant of and during power transmission between said controller and said at least one module without loss of data transmission time and without affecting the transfer of power to said at least one module.

In another broad form the present invention comprises:

a two wire communication system capable of transmitting data and transferring power by means of an electrical bi-polar waveform across a two wire conductor from a controller in communication with said conductor to at least one module in communication with said controller and/or data from said at least one module to said controller; the two wire system including a remote electrical device in communication with said controller;

wherein useable data may be continuously transmitted across said two wire conductor independant of and during power transmission between said controller and said at least one module without loss of data transmission time and without affecting the transfer of power to said at least one module; wherein the system is capable of using up to 100% of available transmission time to transmit data without affecting transfer of power to said at least one module, and wherein data and power transfer are effected through the same transmission line.

According to a preferred embodiment, a plurality of modules are connected in parallel and are each capable of transmitting and receiving data across said conductor.

Preferably, when the controller is transmitting data said modules are capable of drawing power and when each said modules transmit data they do not draw power from said controller nor from other modules.

Each module is capable of transmitting data by putting a low impedance signal across said two wire conductor wherein; said low impedance signal from said module for data transmission does not distort pulse duration allowing said controller to transmit data on the two-wire transmission line to any value independant of said impedance signal from each module.

The low impedance signal may convey analogue or digital information by either modulating the current, voltage or duration of said low impedance signal.

In a further broad form the present invention comprises:

a two-wire communication system for transmitting power and data between a controller and at least one module; said system including a two wire transmission line including, two data channels which allow two independant bi-directional communication channels between the controller and said at least one module wherein power may be drawn by said at least one module whilst ever the controller is transmitting data on either data channel; wherein when said module is transmitting data back to the controller no power transfer is possible to other modules.

In another broad form the present invention comprises: a two wire communication system for transmitting power and data between a controller and at least one module, said system including a two wire transmission conductor including two data channels which allow two independant bi directional communication channels between the controller and said at least one module wherein power may be drawn by said at least one module whilst ever the controller is transmitting data on either data channel; wherein when said module is transmitting data back to the controller no power transfer is possible to other modules; wherein the system includes a P-side channel allowing bi-directional data flow and power transfer from said controller to said at least one module and an N-side channel allowing bi-directional data flow and power transfer between the controller and said at least one module; wherein, when data is transmitted on said P-side channel, said controller modulates at the P-side pulse width to effect data transfer such that the system is capable of utilising up to 100% of the transmission time to transmit data without affecting the transfer of power across said two wire transmission conductor.

According to a preferred embodiment there is provided means at the controller and modules to convey data to connected remote electrical devices and receive data from said connected remote electrical devices. According to the preferred embodiment there are a plurality of sparsely separated modules connected in parallel across said conductor along with one controller which is connected in parallel across said two-wire conductor.

Preferably a bi-polar signaling scheme is used which provides high noise immunity. The two polarities of the two wire conductor are designated P-side and N-side, wherein, the pulse width of the P-Side pulses and N-side pulses are modulated by the controller to convey all data to all modules connected to the two-wire conductor.

Preferably, all modules connected to the conductor can take power from the conductor when the controller is transmitting data. The relative duration of the controller data compared with the module data determines the power duty cycle for the conductor.

Preferably, the power available to the modules connected to the conductor can be traded off against communication speed.

Modules connected to the conductor can pass data to the controller by putting low impedance across the conductor. The controller can then modulate the duration of the pulse in response to the low impedance signal from the module.

The low impedance signal from the module does not distort the duration of the pulse directly, so the controller can still force data on the conductor to any desired value independantly of the modules low impedance signal.

Further, the module's low impedance signal may convey analogue or digital information by either modulating the current, voltage or duration of the low impedance signal.

The present invention will now be described according to a preferred but non limiting embodiment and with reference to the accompanying illustrations.

BRIEF DESCRIPTION OF THE ILLUSTRATIONS

FIG. 1: is a block diagram of an overview of the system according to one embodiment of the invention.

Figure 2:
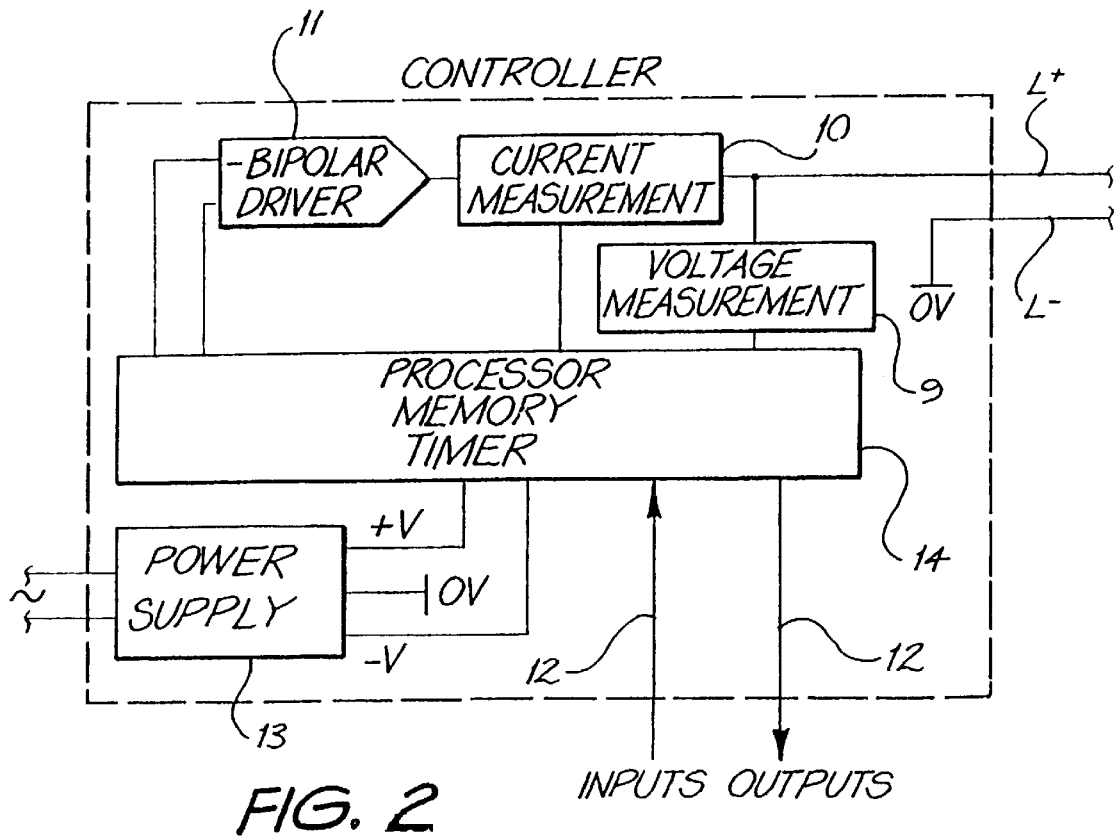

FIG. 2: is a block diagram of the controller according to one embodiment of the invention.

Figure 3:
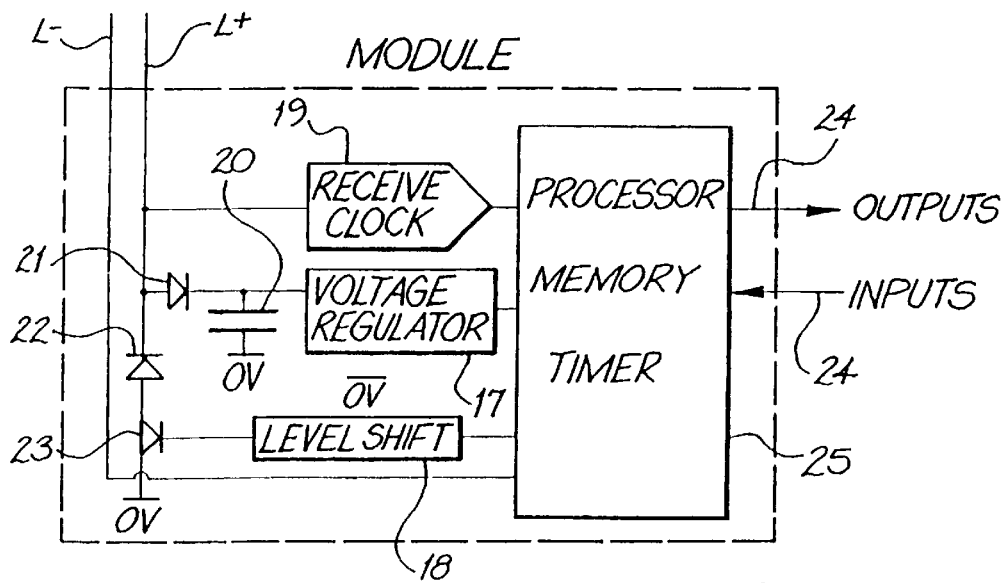
Figure 4:
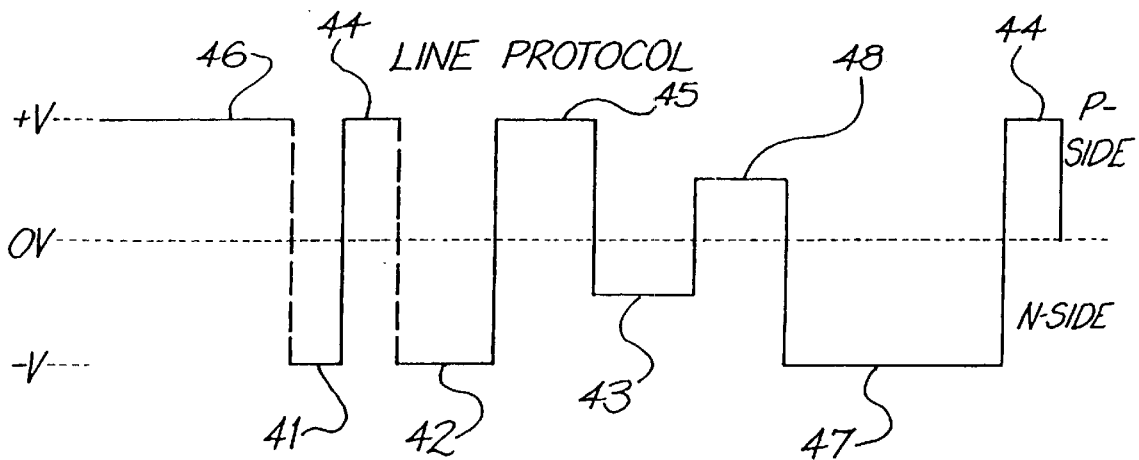

FIG. 3: is a block diagram of the module according to one embodiment of the invention; and, FIG. 4; is a block diagram of a P-Side N-side line protocol according to a preferred embodiment of the invention.

Figure 5:
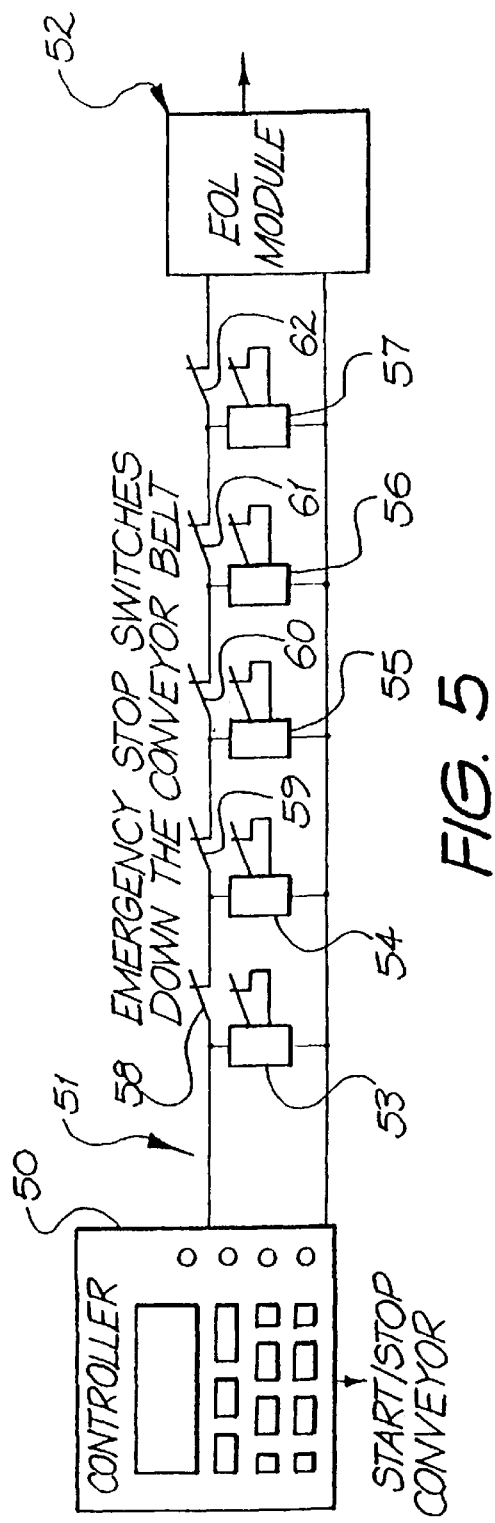
Figure 5A:
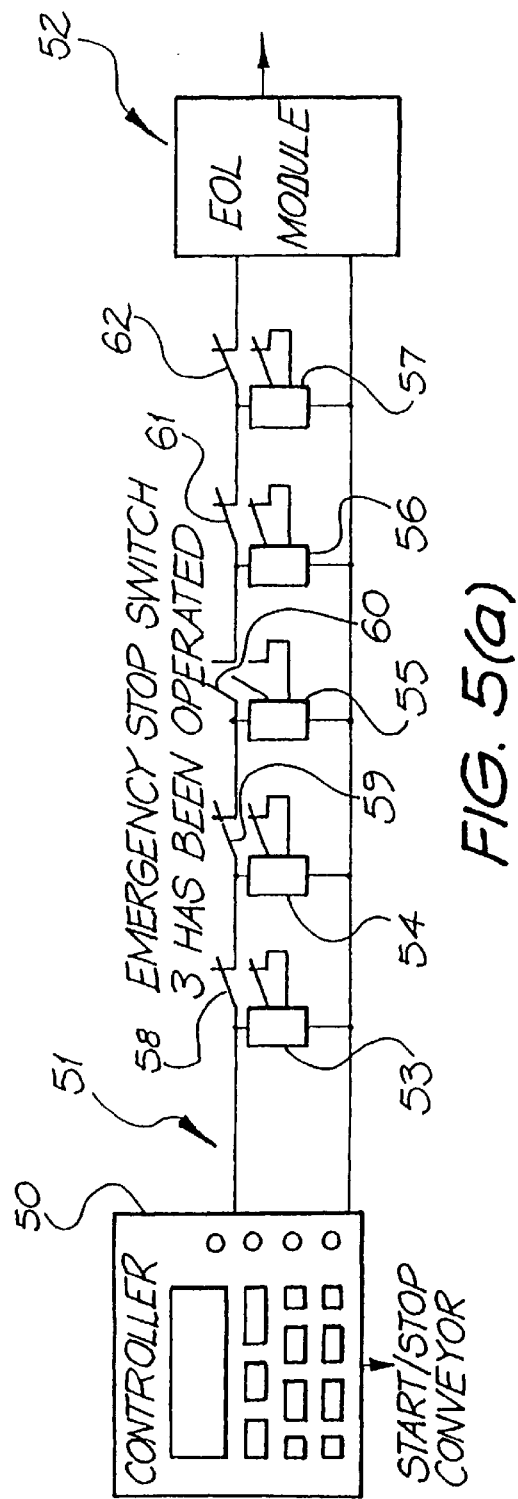

FIG. 5 shows a schematic example of a system arrangement involving monitoring of emergency stop switches; and FIG. 5a shows the arrangement of FIG. 5 with one emergency stop switch operated.

DESCRIPTION OF PREFERRED EMBODIMENT OF THE INVENTION

The DLPCS according to the invention was developed for use in particular, though not exclusively in long distance mining operations where explosive atmospheres require that power voltages and current be kept to safe minimums.

Due to large power and data transmission distances in mining applications, constraints on transmission of power would normally compromise data transmission. These constraints are not an issue in relatively short distance communications in normal above ground operations presently satisfied by prior art technology.

A preferred embodiment of the invention is shown in FIG. 1 and comprises a schematic layout of the two wire communication system. The system shown comprises a controller 1 including means to receive inputs 2 and deliver outputs 3 and in communication with a first end 4 of a two wire conductor 5 comprising an L+ wire and an L− wire. The system further comprises a multiplicity of modules 6, 7 and 8 each remote from one another and which are in communication with said L+ and L− wires such that each module is in communication with controller 1 and in communication with each other module. The system is such that data can be transmitted from the controller 1 onto the transmission line L+ and L− and received at said modules 6, 7 and 8. Data can also be transmitted from any one module 6, 7 and 8 onto the transmission lines L+ and L− and received at the controller 1 and at any one of the remaining multiplicity of modules. By means of connection inputs and outputs 2 and 3, data is transferred between remote electrical devices and the controller 1.

FIG. 2 shows a controller according to a preferred embodiment. The controller includes a power supply 13 which converts high voltage power to low voltage power levels appropriate for the chosen application. Processor 14 is programmed to effect all the control and timing functions inside the controller. Remote electrical devices are connected to the controller via Inputs and Outputs 12. The bi-polar driver 11 is a controllable power source which can drive power into the conductors L+ and L− in a negative polarity. The current being drawn by modules connected to the two wire line L+ and L− is monitored by current measurement 10. The voltage on the line L+ and L− is measured by voltage measurement 9.

FIG. 3 shows a block diagram of the module according to one embodiment of the invention. The module includes power supply voltage regulator 17. storage capacitor 20 and steering diode 21. The module's reply circuitry comprises Level Shift 18, reply transistor 23 and steering diode 22. Data and timing is taken from receive clock 19. The processor 25 is programmed to effect all the control and timing functions inside the module. Remote electrical devices are connected to the module via inputs and outputs 24.

FIG. 4 shows a block diagram of a P-Side N-side line protocol according to a preferred embodiment of the invention.

The P-side channel and the N-side communication channels are bi directional communication channels between the controller and the modules 6, 7 and 8. When transmitting data on the P-side channel the controller 1 modulates the P-side pulse width to effect data transfer. According to the preferred embodiment of the invention, three symbols are used to effect data transfer on the P-side, namely a synchronous pulse 46, a zero pulse 44 and a one pulse 45. A reply pulse 48 has the same period as a one pulse 45. The period of the synchronous pulse 46 is longer than the one pulse 45. The one pulse 45 is longer than the zero pulse 44.

A synchronous pulse 46 alerts all modules connected to the line that new data follows. The digital data in the new data to be transmitted is represented by zero pulses 44 and one pulses 45.

If the controller wants to transmit data on the P-side channel it transmits Zero pulses 44 and one pulses 45 according to the digital data being transmitted. If a module is transmitting data on the P-side channel the controller issues a zero pulse 44 and modulates the period to a one pulse 45 if a low impedance is measured during the zero pulse 44. When a low impedance is placed on the two wire conductor by a module, the line voltage is reduced and line current is increased as in the reply pulse 48.

When transmitting data on the N-side channel the controller modulates the side pulse width to effect data transfer. According to the preferred embodiment of the invention, three symbols are used to effect data transfer on the Signal side, a synchronous pulse 47, a zero pulse 41 and a one pulse 42. A reply pulse 43 has the same period as a one pulse 42. The period of the synchronous pulse 47 is longer than the one pulse 42. The one pulse 42 is longer than the zero pulse 41. The controller transmits a synchronous pulse 47 to alert all modules connected to the line that new data follows. The digital data to be transmitted is represented by zero pulses 41 and one pulses 42. If the controller wants to transmit data on the N-side channel it transmits Zero pulses 41 and one pulses 42 according to the digital data being transmitted. If a module is transmitting data on the N-side channel the controller issues a zero pulse 41 and modulates the period to a one pulse 42 if a low impedance is measured during the zero pulse 41. When a low impedance is placed on the two wire conductor by a module the line voltage is reduced and line current is increased as in the reply pulse 43. The controller reads the current measurement 12 and voltage measurement 11 to determine if a module is placing a low impedance on the conductor and modulates the period to the same length of a one pulse 42 if a low impedance is detected. If there is no reply from a module connected to the conductor the controller terminates the pulse when it is equal to a zero pulse 41.

In the foregoing embodiment, digital data is transferred over the P-side channel and the signal N-side channel. A higher level protocol enables addressing and arbitration between modules so individual modules can be individually accessed. However it is clear that many high level protocols including fill duplex communication can be supported using the two communication channels on the P-side and N-side.

It is also clear that the pulse period can be modulated with analogue data instead of the digital modulation used in the foregoing embodiment. In fact, any number of pulse symbols and analogue modulation of the pulse period could be supported under a high level protocol.

Refering to FIG. 5 there is shown an example of the use of a system in accordance with the present invention. The system shown is applicable to transmission of data relating to a conveyor belt used for example in mining operations particularly though not exclusively where communications over 5 kilometers are required and where the potentially explosive atmospheres common in mining, limits the energy that may be applied to wire conductors to avoid ignition of explosive gas. The system includes a controller 50 linked to one end of a two wire communication line 51 and at the other end, to an end of line module 52. The system further comprises a plurality of additional modules 53, 54, 55, 56 and 57, connected in parallel and in electrical communication with respective associated switches 58, 59, 60, 61 and 62.

In accordance with the system set up, the emergency switches are monitored for correct operation and should any one of switches 58, 59, 60, 61 and 62 be operated the end of line module 52 will be open circuit and will go off line in view of the series connection with module 52. Each emergency stop switch has two contacts which are operated simultaneously should the emergency stop switch be operated. The second of the two contacts is monitored by the modules 53, 54, 55, 56 and 57 allowing the modules to report back to the controller on which emergency switch has been operated.

FIG. 5a shows the arrangement of FIG. 5 wherein emergency switch 60 has been operated. Two wire communication line is now open at module 55 rendering modules 56 and 57 to be off line. Module 55 will send data back to controller 50 indicating that it's emergency switch 60 has been operated.

While a preferred embodiment has been described, it is understood that numerous variations and modifications may occur to those skilled in the art without departing from the overall spirit and scope of the invention.

What is claimed is:

1. A two wire communication system capable of transmitting data and transferring power by means of an electrical bi-polar waveform across a two wire conductor from a controller in communication with said two-wire conductor to at least one module in communication with said controller and capable of transmitting data from said module to said controller; the system further comprising a remote electrical device in communication with said controller; wherein the system is capable of continuous transmission of useable data across said two wire conductor independent of and during power transmission between said controller and said at least one module without loss of data transmission time and without affecting the transfer of power to said at least one module.

2. A two wire communication system according to claim 1 wherein said data is transmitted across said two wire conductor to said at least one module by pulse at the same time power is transmitted to said at least one module.

3. A two wire communication system capable of transmitting data and transferring power by means of an electrical bi-polar waveform across a two wire conductor from a controller in communication with said two-wire conductor to at least one module in communication with said controller and capable of transmitting data from said module to said controller, and a remote electrical device in communication with said controller; wherein the system is capable of continuous transmission of useable data across said two wire conductor independent of and during power transmission between said controller and said at least one module without loss of data transmission time and without affecting the transfer of power to said at least one module; wherein, said data is transmitted across said two wire conductor to said modules by pulse duration signals at the same time power is transmitted to said modules; wherein, the system is capable of using up to 100% of transmission time to transmit data without affecting transfer of power to said at least one module.

4. A two wire communication system according to claim 3 wherein data and power transfer are effected through the same transmission line.

5. A two wire communication system according to claim 4 wherein a plurality of modules are connected in parallel and which are each capable of transmitting and receiving data across said conductor.

6. A two wire communication system according to claim 5 wherein the controller is connected in parallel across the conductor.

7. A two wire communication system according to claim 6 wherein said modules are capable of drawing power when the controller is transmitting data.

8. A two wire communication system according to claim 7 wherein when each said modules transmit data they do not draw power from said controller nor from other modules.

9. A two wire communication system according to claim 8 wherein each module is capable of transmitting data by putting a low impedance signal across said two wire conductor.

10. A two wire communication system according to claim 9 wherein said low impedance signal from said module for data transmission does not distort the pulse duration allowing said controller to transmit data on the transmission line to any value independent of said impedance signal from each module.

11. A two wire communication system according to claim 10 wherein said low impedance signal may convey analogue or digital information by either modulating the current, voltage or duration of said low impedance signal.

12. A two wire communication system according to claim 11 wherein the two wire conductor includes polarities designated as first and second channels the first of which is a P-side channel allowing bi-directional data flow and power transfer and the second of which is an N-side channel allowing the bi-directional data flow and power transfer.

13. A two wire communication system according to claim 12 wherein said first P-side channel allows two way communication between said controller and said modules.

14. A two wire communication system according to claim 13 wherein said second N-side channel allows two way communication between said controller and said modules.

15. A two wire communication system according to claim 14 wherein pulse widths of the P-side pulses are modulated by the controller to convey all data to all modules connected to the two wire conductor.

16. A two wire communication system according to claim 15 wherein the N-side pulse widths are modulated by the controller to convey all data to all modules connected to the two wire conductor.

17. A two wire communication system according to claim 16 wherein the data is transferred between the controller and said plurality of modules by modulation of the pulse width of the P-side and N-side pulses.

18. A two wire communication system according to claim 17 wherein the P-side channel is independent of the N-side communication channel.

19. A two wire communication system according to claim 18 wherein the data is transmitted on the P-side channel by modulation of the P-side pulse width.

20. A two wire communication system according to claim 19 wherein power may be taken from the two wire conductor during either N-side or P-side polarities whilst ever said controller transmits data.

21. A two wire communication system according to claim 20 wherein there is provided means at the controller to measure the voltage of the conductor and the current into the conductor such that the low impedance signals from the modules are detected.

22. A two wire communication system according to claim 21 wherein there is provided means at the controller to control the duration of a power source in either polarity, wherein the duration of the power transmission is represented in an analogue or digital value.

23. A two wire communication system according to claim 22 wherein there is provided means at the module to sense the polarity of the conductor and measure the duration of transmission in either polarity.

24. A two wire communication system according to claim 23 wherein there is provided means at the module to receive power from the conductor.

25. A two wire communication system according to claim 24 further comprising means at the controller and modules to convey data to and receive data from connected remote electrical devices.

26. A two wire communication system according to claim 25 wherein there is provided means at said modules to reply on said conductor by placing a low impedance across said conductor; wherein, said controller can modulate duration of pulse in response to said low impedence signals from said module.

27. A two wire communication system according to claim 26 wherein the controller includes therewithin the power source which can be impressed on the conductor in a positive or negative polarity.

* * * * *